United States Patent [19]

Leturno

[11] Patent Number: 5,257,732
[45] Date of Patent: Nov. 2, 1993

[54] LAMINAR BARRIER INERT FLUID SHIELD APPARATUS

[75] Inventor: David B. Leturno, Bessemer, Ala.

[73] Assignee: Praxair Technology, Inc., Danbury, Conn.

[21] Appl. No.: 901,956

[22] Filed: Jun. 22, 1992

Related U.S. Application Data

[62] Division of Ser. No. 668,921, Mar. 13, 1991, Pat. No. 5,152,453.

[51] Int. Cl.$^5$ ............................................. B23K 31/02
[52] U.S. Cl. ..................................... 228/219; 228/42; 219/137.42
[58] Field of Search ....................... 239/145, 542, 548; 228/219, 42; 219/137.42, 74, 137.43

[56] References Cited

U.S. PATENT DOCUMENTS

| | | | |
|---|---|---|---|
| 2,866,074 | 12/1958 | Ronay | 219/74 |
| 2,918,563 | 12/1959 | Ternisien et al. | 219/74 |
| 3,053,967 | 9/1962 | Gorman et al. | 219/74 |
| 3,125,666 | 3/1964 | Gorman et al. | 219/74 |
| 3,199,573 | 8/1965 | Flynn | 239/145 |
| 3,603,509 | 9/1971 | Necline | 239/145 |
| 3,722,539 | 3/1973 | Schmidt | 239/145 |
| 3,826,888 | 7/1974 | Garfield et al. | 219/74 |
| 3,881,894 | 5/1975 | Onufer | 55/387 |
| 4,166,940 | 9/1979 | Barger et al. | 219/74 |
| 4,179,059 | 12/1979 | Chang et al. | 228/103 |
| 4,516,723 | 5/1985 | Hesse | 239/172 |
| 4,528,436 | 7/1985 | Stor | 219/74 |
| 4,562,334 | 12/1985 | Brandt | 219/74 |
| 4,567,343 | 1/1986 | Sullivan et al. | 219/74 |
| 4,599,505 | 7/1986 | Lukens et al. | 219/74 |
| 4,839,489 | 6/1989 | Dyer | 219/74 |
| 4,866,236 | 9/1989 | De Nale et al. | 219/137.42 |
| 4,923,212 | 5/1990 | Cuevas | 280/731 |
| 5,067,559 | 11/1991 | Perkinson | 261/98 |
| 5,152,453 | 10/1992 | Leturno | 228/219 |

Primary Examiner—Richard K. Seidel
Assistant Examiner—James Miner
Attorney, Agent, or Firm—Chung K. Pak

[57] ABSTRACT

The present invention relates to processes and apparatus for welding or joining metal parts which comprise moving a welding torch in a direction along a joint between said parts, causing a molten pool of metal with said welding torch along the joint and directing a laminar flow of inert fluid toward a freshly welded area behind said welding torch in the form of a trailing shield whereby the freshly welded area is protected from the surrounding air during its solidification. The laminar flow or inert fluid may also be directed along the joint ahead of the welding torch in the form of a leading shield such that turbulence in and around the joint caused by a high welding speed is reduced, thereby preventing oxygen entrainment in said molten pool of metal. The laminar flow of inert fluid is usually provided through at least one diffuser having at least one porous diffusing surface which is generally provided with a screen and/or a spatter shield.

6 Claims, 2 Drawing Sheets

LAMINAR BARRIER INERT FLUID SHIELD APPARATUS

This application is a division of prior U.S. application Ser. No. 07/668,921, filed on Mar. 31, 1991 now U.S. Pat. No. 5,152,453.

BACKGROUND OF THE INVENTION

The invention relates in general to processes and apparatus for providing a laminar flow of inert fluid effectively around a molten and cooling weld puddle and in particular to processes and apparatus for providing a laminar flow of inert fluid in the form of a leading and/or trailing shield to protect a molten and cooling weld puddle during the welding operation.

Generally, welding involves application of the heat generated by a welding torch to a work piece, or to a joint between adjacent metal parts in a localized manner to effect fusion between the pieces or parts to be joined. Such a welding operation usually takes place in the presence of an inert shielding gas to prevent contamination of the region being treated, such as a molten weld puddle, from the surrounding air. Commonly, the inert shielding gas is introduced to a molten weld puddle area via an annular passageway or other passageways surrounding a welding torch to protect a very limited area beneath the torch from the surrounding air. Shielding a very limited area in this manner, however, can adversely affect, inter alia, the mechanical and corrosion resistance properties and the surface appearance of a weld. Weld areas, for example, can still be subject to air contamination or oxidation during the welding stage when an inert gas is contaminated with the surrounding air or during the solidification stage when an inert shielding gas is no longer present.

Due to the recognition of the importance of a shielding means in obtaining high quality weld areas, various shielding arrangements have been Proposed. For instance, U.S. Pat. Nos. 4,166,940, 4,179,059, 4,528,436 and 4,567,343 show a double shielding means wherein an initial shielding means is augmented or supplemented with a secondary shielding means. Inert shielding gases are introduced in such a manner as to provide the initial shielding means generally surrounded with the secondary shielding means. Similarly, U.S. Pat. No. 4,839,489 shows a plurality of shielding means wherein inert gases are provided in a trailing and leading fashion to protect the freshly welded area and an area ahead of the welding torch which is preheated due to close proximity to the welding operation. These shields, however, may not be effective in protecting the welded area from the surrounding air as the air migrates or aspirates into the heated region. The failure to reduce turbulence, which may result from a high welding speed, around an area to be welded or to maintain a proper flow of inert fluid, for example, may cause oxygen entrainment in the welded area or oxidation of the welded area. The effectiveness of these shielding means can further deteriorate as the flow of an inert shielding gas is hindered or hampered as a result of condensing metal vapors clogging the porous diffusing surface of a diffuser. Moreover, molten weld materials, which may propel away from a weld area during the welding operation, may cause damage to a welding system involved or cause an injury to a person operating the welding system.

It is an advantage of the present invention in providing an improved shielding arrangement wherein the quality of the finished weld is enhanced; thus reducing the need for postweld cleaning and improving the quality of postweld plating which may be applied to the finished weld.

It is another advantage of the present invention in recognizing a better method for obtaining a laminar flow of inert fluid around a molten and cooling weld puddle during the welding operation.

It is yet another advantage of the present invention in increasing a welding speed while minimizing oxidation of the bead surface, i.e. the weld area.

It is a further advantage of the present invention in mitigating or alleviating the clogging effect on the porous surface of a diffuser, thereby preventing any interference in the flow of a shielding fluid.

It is an additional advantage of the present invention in providing a means by which the weld spatter can be prevented from damaging the welding apparatus involved.

SUMMARY OF THE INVENTION

The present invention relates to a process for welding or joining metal parts which comprises moving a welding torch in a direction along a joint between said parts, causing the formation of a molten pool of metal with said welding torch along the joint and directing a laminar flow of inert fluid toward a freshly welded area behind said welding torch in the form of a trailing shield whereby said freshly welded area is protected from the surrounding air during its solidification. The laminar flow of inert fluid may also be directed along the joint ahead of said welding torch in the form of a leading shield such that turbulence in and around the joint caused by a high welding speed is reduced to prevent oxygen entrainment in said molten pool of metal. The direction of said laminar flow of inert fluid and an area covered by said laminar flow of inert fluid are such that no freshly welded area is susceptible to oxidation and/or such that said turbulence in and around the joint is reduced to prevent oxygen entrainment in said molten pool of metal. The laminar flow of inert fluid is usually provided through at least one diffuser having at least one porous diffusing surface which is generally made up of a sheet of sintered metal powder.

To this at least one diffuser, at least one screen is releasably or removably mounted to cover its at least one porous diffusing surface so that said at least one porous surface is protected from clogging due to metal vapor condensation and possible damage from a weld spatter during a welding operation. The screen can be readily replaced without adversely affecting the diffuser, once its use is no longer feasible, i.e., once it is clogged due to the metal vapor condensation. The application of at least one screen on at least one porous diffusing surface of at least one diffuser does not adversely affect a laminar flow of inert fluid due to the type of a screen design employed. Typically, the screen employed is a fine mesh screen which may be constructed with metals or alloys such as stainless steel.

This screen can also be designed to accommodate or fit into any shield fluid distributing apparatus which is part of a welding device. A shield fluid distributing apparatus for a welding device, for example, may comprise:

(a) at least one diffuser means having at least one porous diffusing surface; and (b) at least one screen means removably or releasably mounted on said at least one diffuser means to cover said at least one porous surface thereof, said screen being shaped such that the clogging effect on said at least one porous surface, as a result of metal vapor condensation during the welding operation, is reduced or prevented.

In addition to the screen, at least one spatter shield can be releasably or removably mounted on at least one diffuser of a welding device. The spatter shield is preferably placed on the front edge of a diffuser in close proximity of a welding torch so that any large metal globules, which may be propelling away from a weld area, are deflected, thereby protecting a welding device involved. The spatter shield generally comprises a strip of metal.

As used herein, "a trailing shield or trailer shield" means that as a welding torch traverses and welds sections of metal to be joined, a shielding means, such as inert fluid or inert fluid producing means, is provided behind the welding torch to cover the freshly welded hot metal with a protective atmosphere of said inert fluid.

As used herein, "a leading shield" means that a shielding means is placed ahead of a welding torch so that substantial sections of metal to be joined or welded are subject to a protective atmosphere of inert fluid. The term "substantial sections" means an area covered by inert fluid is sufficient to reduce turbulence which may result from a high welding speed.

As used herein, "laminar" flow means that the root mean square of the random fluctuations in the fluid layer velocity at the source or origin of the fluid layer are less than about 0.1 times the average velocity of the fluid in its direction of flow at its source of origin and that the root means square of the sizes of turbulent eddies in the fluid layer at its source of origin are less than 0.1 times the thickness of the layer at the source of origin of the fluid layer.

As used herein, "inert fluid" means any liquid and/or gaseous substance which could prevent metals for oxidizing during the welding operation. The substance generally comprises, for example, argon, nitrogen, helium, hydrogen, $CO^2$, etc. . . . or mixtures thereof. The preferred substance, however is argon or a mixture containing argon which may have an inert amount of oxidizing gases.

DETAILED DESCRIPTION OF THE INVENTION

The invention relates to an improved method for obtaining a laminar flow of inert fluid around a molten and cooling weld puddle. By using a laminar flow with a particular diffuser arrangement, the quality of the finished weld is improved, thereby reducing the need for postweld cleaning. The quality of postweld plating that may be applied to the finished weld is also enhanced.

Usually, this particular diffuser arrangement is used in conjunction with a conventional inert shielding means which is commonly used to protect a limited area beneath a welding torch during the welding process. This additional shielding is provided with a laminar flow of inert fluid in the form of a trailing shield to protect the solidifying weld material from oxidation as the welding torch moves out of a weld zone and/or in the form of a leading shield to reduce turbulence in a weld zone, thus preventing oxygen entrainment in the resulting weld.

The particular diffuser arrangement becomes especially useful when it is modified by incorporating at least one screen and/or at least one spatter shield. While the life of at least one diffuser can be extended through using at least one screen, the life of a welding system can be extended through using at least one spatter shield. The extension of the life of at least one diffuser is particularly noteworthy since current diffuser construction makes replacement of the porous diffusing surface of a diffuser difficult.

Figure 1:
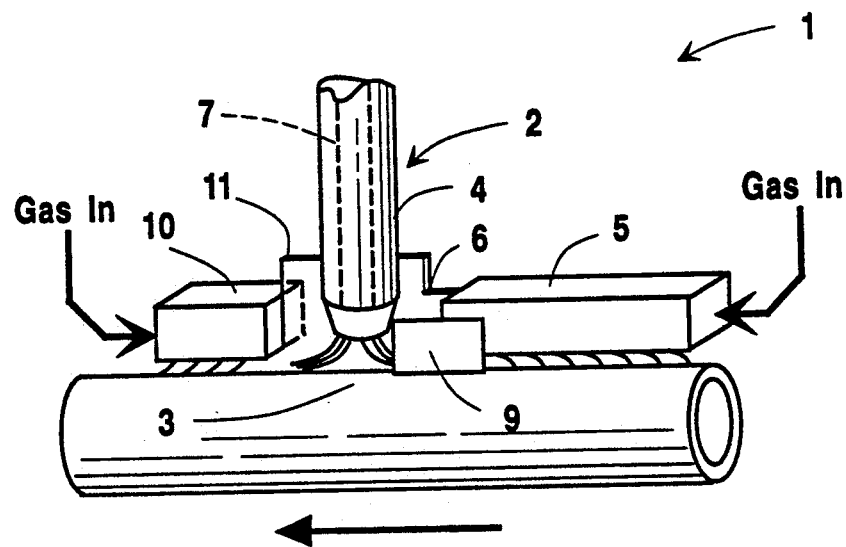
FIG. 1 represents one embodiment of the invention which illustrates a cross-sectional view of a welding device having trailing and leading shields.
Figure 2:
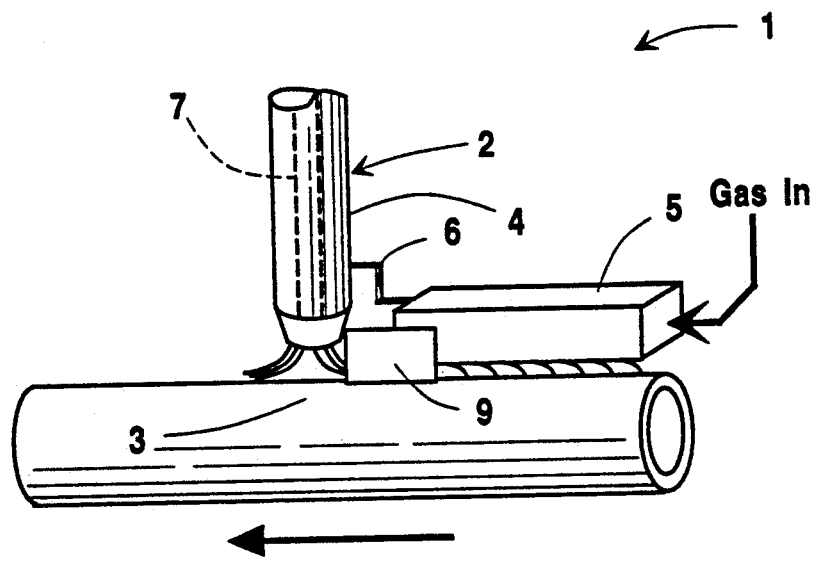
FIG. 2 represents one embodiment of the invention which illustrates a cross-sectional view of a welding device having a trailer shield.
Figure 3:
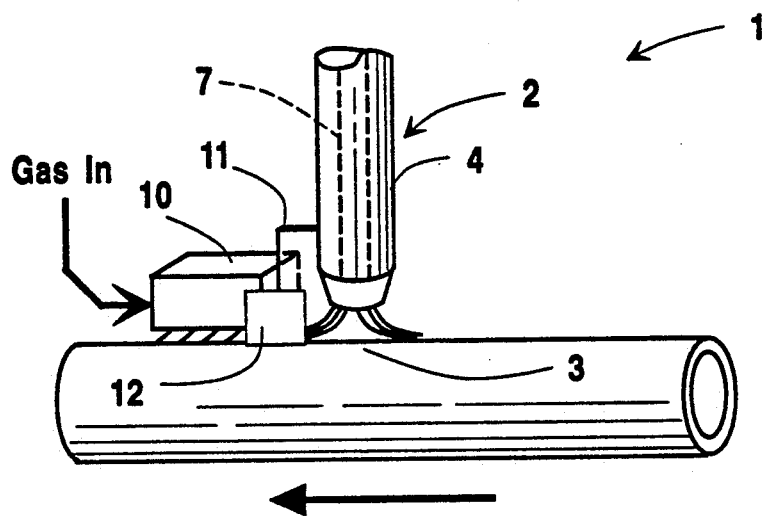
FIG. 3 represents one embodiment of the invention which illustrates a cross-sectional view of a welding device having a leading shield.

Referring to FIGS. 1, 2 and 3, the direction of travel of a welding device (1) is shown by the arrow. The welding device (1) comprising a gas shielded welding torch (2) travels along a joint between adjacent metal pieces (3) to be welded to cause a molten pool of metal along the joint. The welding torch (2) comprises an electrode (7) which is disposed inside an elongated housing means (4) to extend axially thereof. At least one conventional shielding means (not shown) is placed on or in this elongated housing means (4) to provide inert gas around an area which is being welded.

The housing means (4) is connected to a trailer shield assembly (5) via a coupling means (6). The trailer shield assembly (5) is releasably or removably mounted on the back of the welding system (1) so that as the welding torch (2) traverses and welds the metal pieces, it follows and covers the freshly welded area with a protective blanket of inert fluid. The trailer shield assembly (5) comprises at least one diffuser having at least one porous diffusing surface facing toward the freshly welded area and at least one spatter shield (9) comprising a strip of metal or alloys, such as stainless steel, mounted on the front edge of said at least one diffuser in close proximity of the welding torch (2) to deflect any metal globules which may be propelled away from a weld area.

To this welding device having a trailer shield assembly, a leading shield assembly (10) is provided to further enhance the quality of the finished weld. The leading shield assembly (10), however, can be used alone with a welding torch as shown in FIG. 3. The leading shield assembly (10) is connected to the housing means (4) via a coupling means (11) on the front of the welding device (1) so that a laminar flow of inert fluid is provided along the joint to be welded ahead of the welding torch (2). The leading shield assembly (10) comprises an optional spatter shield (12) placed on the front edge of at least one diffuser having at least one porous diffusing surface which size is sufficient to reduce turbulence, caused by a high welding speed, along the joint, thereby reducing oxygen entrainment in the resulting weld. The size of the diffusing surface is such that it extends beyond an area which is preheated due to the preheated area's close proximity to an area being welded.

Figure 4:
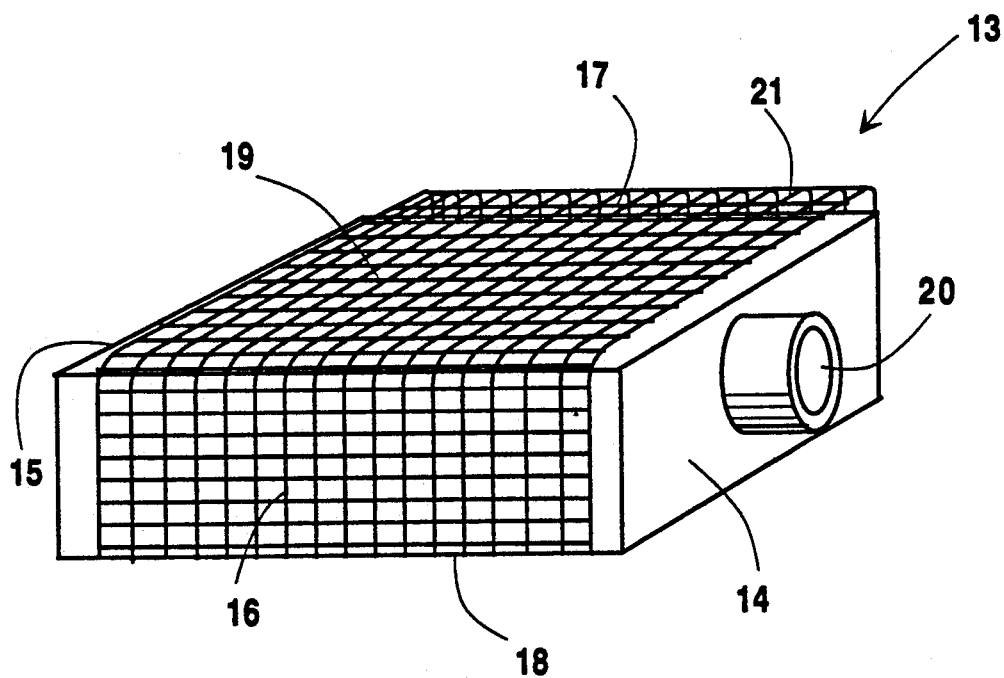
FIG. 4 represents one embodiment of the invention which illustrates a cross-sectional view of a diffuser having a screen mounted thereon.

As shown in FIG. 4, the preferred diffuser employed in both the leading and trailer shield assemblies is generally defined by a rectangular box (13) having sides (14 and 15), a front (16), a back (17), a top (18) and a bottom diffusing surface (19). On one of the sides, there is opening (20) for receiving inert fluid which is to be diffused through the bottom surface (19) at a flow rate of about 35 to about 100 cfh, preferably about 60 to about 100 cfh. The bottom diffusing surface (19) is constructed with a sheet of sintered metal or alloys, such as stainless steel, and has a pore size of about 1.0 to about 40 microns. The size of the diffusing surface area is defined by at least about 1.5 inches in length and at least about 1.0 inches in width, more preferably at least about 2 or about 6 inches in length and at least about 2 inches in width. The size of the diffusing surface area, however, varies with the type of welding operation involved, including the reason or purpose for employing the diffuser.

The life of this diffuser can be extended when it is modified by incorporating at least one screen (21). The screen (21) is usually mounted on the diffuser via a coupling means such as studs, located on the top of the diffuser to cover the diffusing surface (19). This externally placed screen prevents the diffusing surface (19) from clogging by capturing the metal fume resulting from the welding operation. The screen can be made with various metals and alloys. The screen, however, is preferably made with stainless steel and has a fine mesh, that is, about 320 to about 400 mesh.

The present invention imparts various advantages in welding processes, especially in tungsten arc and gas metal arc welding operations, by providing particular shielding arrangements. The advantages can be seen in (1) the quality of the finished weld, (2) the welding speed involved without compromising the quality of the finished weld, (3) the extended life of a diffuser and other welding units, and (4) the application of a laminar flow of inert fluid without interrupting the welding process.

Although the process and apparatus of the invention has been described in detail with reference to certain embodiments, those skilled in the art will recognize that there are other embodiments of the invention within the spirit and scope of the claims.

What is claimed is:

1. A shielding device comprising:
   (a) at least one diffuser means having at least one porous diffusing surface comprising pores having sizes in the range of about 1 to about 40 microns; and
   (b) at least one screen means removably or releasably mounted on said at least one diffuser means to cover said at least one porous diffusing surface thereof, said screen means comprising a fine mesh screen having about 320 to about 400 mesh to inhibit metal vapor from clogging said at least one porous diffusing surface.

2. A shield gas distributing apparatus capable of being used in welding, said shield gas distributing apparatus comprising:
   (a) at least one diffuser means having at least one porous diffusing surface comprising pores having sizes in the range of about 1 to about 40 microns; and
   (b) at least one screen means covering said at least one porous diffusing surface thereof, said screen means comprising a fine mesh screen having about 320 to about 400 mesh to reduce or prevent condensation of metal vapor on said at least one porous diffusing surface.

3. The shield gas distributing apparatus as in claim 2, wherein said at least one porous diffusing surface is made up of a sheet of sintered metal or alloy.

4. A shield gas distributing apparatus comprising:
   (a) at least one diffuser means comprising at least one inlet for receiving inert fluid and at least one porous surface comprising pores having sizes in the range of about 1 to about 40 microns for emitting inert fluid;
   (b) at least one inert fluid source in fluid communication with said at least one inlet; and
   (c) at least one screen covering said at least one porous surface to protect said at least one porous surface.

5. The shield gas distributing apparatus as in claim 4, wherein said at least one screen is a fine mesh screen having about 320 to about 400 mesh.

6. A shield gas distributing apparatus comprising:
   (a) at least one diffuser means comprising at least one porous surface comprising pores having sizes in the range of about 1 to about 40 microns for emitting inert fluid;
   (b) at least one source capable of introducing inert fluid, which is in fluid communication with said at least one diffuser means; and
   (c) at least one screen covering said at least one porous surface to protect said at least one porous surface.

* * * * *